United States Patent
Selig et al.

(10) Patent No.: US 12,466,826 B2
(45) Date of Patent: *Nov. 11, 2025

(54) 3-BENZOYL-1H-PYRROLO[2,3-B]PYRIDINE DERIVATIVES AS MKK4 INHIBITORS FOR TREATING LIVER DISEASES

(71) Applicant: HepaRegeniX GmbH, Tübingen (DE)

(72) Inventors: Roland Selig, Munich (DE); Stefan Laufer, Tübingen (DE); Wolfgang Albrecht, Ulm (DE)

(73) Assignee: HEPAREGENIX GMBH, Tübingen (DE)

( * ) Notice: Subject to any disclaimer, the term of this patent is extended or adjusted under 35 U.S.C. 154(b) by 689 days.

This patent is subject to a terminal disclaimer.

(21) Appl. No.: 17/792,685

(22) PCT Filed: Jan. 13, 2021

(86) PCT No.: PCT/EP2021/050527
§ 371 (c)(1),
(2) Date: Jul. 13, 2022

(87) PCT Pub. No.: WO2021/144287
PCT Pub. Date: Jul. 22, 2021

(65) Prior Publication Data
US 2023/0088395 A1   Mar. 23, 2023

(30) Foreign Application Priority Data

Jan. 15, 2020 (EP) .................................. 20151929

(51) Int. Cl.
*C07D 471/04* (2006.01)
*A61K 31/437* (2006.01)

(52) U.S. Cl.
CPC ................................ *C07D 471/04* (2013.01)

(58) Field of Classification Search
CPC .. C07D 471/04; C07D 401/04; A61K 31/437; A61P 43/00
USPC ................... 546/113; 514/300, 256; 544/242
See application file for complete search history.

(56) References Cited

U.S. PATENT DOCUMENTS

| | | | |
|---|---|---|---|
| 6,514,981 B1 | 2/2003 | Tang et al. | |
| 11,040,027 B2 | 6/2021 | Albrecht et al. | |
| 11,912,701 B2 * | 2/2024 | Albrecht ............... | C07D 471/04 |
| 2020/0399241 A1 | 12/2020 | Scheidt et al. | |
| 2021/0078995 A1 | 3/2021 | Praefke et al. | |
| 2021/0261545 A1 | 8/2021 | Juchum et al. | |
| 2022/0281864 A1 | 9/2022 | Albrecht et al. | |
| 2022/0340561 A1 | 10/2022 | Pfaffenrot et al. | |

FOREIGN PATENT DOCUMENTS

| | | |
|---|---|---|
| CA | 3075477 A1 | 2/2019 |
| CN | 112778311 A | 5/2021 |
| CN | 113072497 A | 7/2021 |
| EP | 2161271 A1 | 3/2010 |
| EP | 2508607 A1 | 10/2012 |
| FR | 2876377 A1 | 4/2006 |
| JP | 2006282745 A | 10/2006 |
| RU | 2678455 C1 | 1/2019 |
| WO | 2003035621 A1 | 5/2003 |
| WO | 2003037898 A1 | 5/2003 |

(Continued)

OTHER PUBLICATIONS

Merriam-Webster, "Prevent", https://www.merriam-webster.com/dictionary/prevent, 2022.
Asaoka, Y, "Diverse physiological functions of JNK signaling networks during early embryogenesis", Comparative Physiology and Biochemistry 30 (2), 59-67 (2013). [English Abstract].
Chem Abstract, Registry No. 1246614-25-4, 1 page (Oct. 20, 2010).
Deibler, K, et al., "A Chemical Probe Strategy for Interrogating Inhibitor Selectivity Across the MEK Kinase Family", ACS Chem Biol 12, 1245-1256, Supporting Information, 82 pages (2017).
Deibler, K, et al., "Synthesis and Biological Evaluation of 3-Arylindazoles as Selective MEK4 Inhibitors", ChemMedChem 14, 615-620 (2019).
Erion, M, et al., "Liver-Targeted Drug Delivery Using HepDirect1 Prodrugs", Journal of Pharmacology and Experimental Therapeutics 312(2), 554-560 (2005).
Grueninger, F, et al., "Novel screening cascade identifies MKK4 as key kinase regulating Tau phosphorylation at Ser422", Mol Cell Biochem 357, 199-207 (2011).

(Continued)

*Primary Examiner* — Charanjit Aulakh
(74) *Attorney, Agent, or Firm* — Viksnins Harris Padys Malen LLP

(57) ABSTRACT

The invention relates to compounds of formula (I) which are inhibitors of MKK4 (mitogen-activated protein kinase kinase 4) and their use in promoting liver regeneration or reducing or preventing hepatocyte death. The compounds selectively inhibit protein kinase MKK4 over protein kinases JNK1 and MKK7. In formula (I), especially, $R^w$ is $-NR^{10}SO_2R^{12}$; either a) $R^x$ and $R^y$ are F and $R^z$ and $R^{zz}$ are H; or b) $R^x$, $R^y$ and $R^{zz}$ are independently halogen and $R^z$ is H; $R^5$ is substituted phenyl or pyrimidinyl.

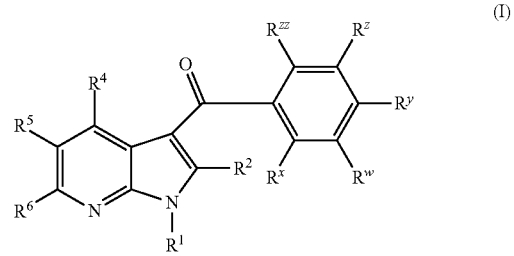

(I)

13 Claims, No Drawings

(56) References Cited

FOREIGN PATENT DOCUMENTS

| | | |
|---|---|---|
| WO | 2004058764 A1 | 7/2004 |
| WO | 2007002325 A1 | 1/2007 |
| WO | 2007002433 A1 | 1/2007 |
| WO | 2007013896 A2 | 2/2007 |
| WO | 2008063888 A2 | 5/2008 |
| WO | 2008064255 A2 | 5/2008 |
| WO | 2008064265 A2 | 5/2008 |
| WO | 2008079903 A1 | 7/2008 |
| WO | 2008079906 A1 | 7/2008 |
| WO | 2010104945 A1 | 9/2010 |
| WO | 2010111527 A1 | 9/2010 |
| WO | 2010129567 A1 | 11/2010 |
| WO | 2010129570 A1 | 11/2010 |
| WO | 2011047432 A1 | 4/2011 |
| WO | 2011079133 A2 | 6/2011 |
| WO | 2012109075 A1 | 8/2012 |
| WO | 2012129562 A2 | 9/2012 |
| WO | 2012135631 A1 | 10/2012 |
| WO | 2012136859 A1 | 10/2012 |
| WO | 2013032951 A1 | 3/2013 |
| WO | 2014035846 A2 | 3/2014 |
| WO | 2014047648 A1 | 3/2014 |
| WO | 2014194127 A1 | 12/2014 |
| WO | 2017066193 A1 | 4/2017 |
| WO | 2018134254 A1 | 7/2018 |
| WO | 2019031990 A1 | 2/2019 |
| WO | 2019149738 A1 | 8/2019 |
| WO | 2019243315 A1 | 12/2019 |
| WO | 2020016243 A1 | 1/2020 |
| WO | 2020051207 A2 | 3/2020 |
| WO | 2020123675 A1 | 6/2020 |
| WO | 2021018820 A1 | 2/2021 |

OTHER PUBLICATIONS

Hu, G , et al., "MicroRNA-145 attenuates TNF-α-driven cartilage matrix degradation in osteoarthritis via direct suppression of MKK4", Cell Death and Disease 8, e3140, 13 pages (2017).

Kim, D , et al., "Novel Small Molecule Raf Kinase Inhibitors for Targeted Cancer Therapeutics", Arch Pharm Res 35(4), 605-612 (2012).

Krishna, S , et al., "A Fluorescence-Based Thermal Shift Assay Identifies Inhibitors of Mitogen Activated Protein Kinase Kinase 4", PLoS One 8(12), e81504, 11 pages (2013).

Ogura, M , et al., "Prenylated quinolinecarboxylic acid derivative prevents neuronal cell death through inhibition of MKK4", Biochemical Pharmacology 1-37, doi: https://doi.org/10.1016/j.bcp.2018.10.008 (2018).

Patent Cooperation Treaty , International Searching Authority, Search Report for PCT/EP2019/052213, 5 pages, dated Mar. 21, 2019.

Patent Cooperation Treaty , Search Report and Written Opinion for PCT/EP2021/050527, 9 pages, dated Mar. 25, 2021.

Schneider, C , et al., "Synthesis of 6-Substituted Pyrido[2,3-b]indoles by Electrophilic Substitution", Synlett 14, 2237-2241 (2007).

Yin, H , et al., "BRAF inhibitors suppress apoptosis through off-target inhibition of JNK signaling", eLife 2, e00969, DOI: 10.755/4/eLife.00969, 1-25 (2013).

Yin, H , et al., "BRAF inhibitors suppress apoptosis through off-target inhibition of JNK signaling", eLife 2, e00969, DOI: 10.7554/eLife.00969, 1-25, Supporting Information—Figures and Supplements (2013).

Wadsworth, A , et al., "A review of the synthesis of a-carbolines", European Journal of Medicinal Chemistry 97, 816-829 (2015).

Willenbring, H. , et al., "A Therapy for Liver Failure Found in the JNK Yard", Cell 153, 283-284 (2013).

Wuestefeld, T , et al., "A Direct in Vivo RNAi Screen Identifies MKK4 as a Key Regulator of Liver Regeneration", Cell 153, 389-401 (2013).

Brahim, P. , "Case History: Vemurafenib, a Potent, Selective, and First-in-Class Inhibitor of Mutant BRAF for the Treatment of Metastatic Melanoma", Annual Reports in Medicinal Chemistry 48(26), 435-449 (2013).

Wermuth, C. , et al., "Molecular Variation Based on Isosteric Replacements", The Practice of Medicinal Chemistry 13, 203-237 (1996).

Pubchem , "Vemurafenib", CID No. 42611257, 54 pages (Create date: Jun. 22, 2009).

\* cited by examiner

3-BENZOYL-1H-PYRROLO[2,3-B]PYRIDINE DERIVATIVES AS MKK4 INHIBITORS FOR TREATING LIVER DISEASES

The present invention relates to protein kinase inhibitors which inhibit mitogen-activated protein kinase kinase 4 (MKK4) and in particular, selectively inhibit MKK4 over protein kinases JNK1 and MKK7.

BACKGROUND OF THE INVENTION

Liver diseases may be caused by infection, injury, exposure to toxic compounds, like alcohol or drugs, autoimmune processes, genetic defects, and other factors. Liver has a remarkable regenerative capacity which, however, may be impaired in disease state and may therefore be insufficient to compensate for the loss of hepatocytes and organ function.

WO 2007/002433 describes compounds which are protein kinase inhibitors useful to treat diseases and conditions associated with aberrant activity of protein kinases. These compounds are inhibitors of Raf protein kinase, in particular B-Raf and c-Raf and mutations thereof and are therefore useful for cancer treatment. Further, they are said to inhibit a large variety of other protein kinases, among them c-Jun N-terminal kinases (JNK) and in particular JNK1. WO 2010/002325 has a similar disclosure and WO 2012/109075 and WO 2014/194127 disclose modified compounds having Raf protein kinase inhibiting activity. H. Vin et al. refer to two compounds of WO 2007/002433 as B-Raf inhibitors that suppress apoptosis through off-target inhibition of JNK signaling. WO 2010/111527 describes pyrazolo[3,4-b]pyridine compounds which are protein kinase inhibitors useful to treat a Raf protein kinase mediated disease or condition, like cancer. Further, they are said to inhibit a large variety of other protein kinases, among them c-Jun N-terminal kinases (JNK) and in particular JNK1. WO 2012/136859 discloses some compounds which are described as inhibitors of mitogen-activated protein kinase kinase 4 (MKK4) and as being useful in the treatment of liver failure, for the protection of hepatocytes against apoptosis and for the regeneration of hepatocytes. Wuestefeld et al. (Cell 153:389-401, 2013) describe a functional genetic approach for the identification of gene targets that can be exploited to increase the regenerative capacity of hepatocytes. In particular, Wuestefeld et al. identify protein kinase MKK4 as a key regulator of liver regeneration and report that MKK4 suppression increased hepatocyte regeneration via compensatory upregulation of MKK7 and a JNK1-dependent activation of ATF2 and ELK1. On the basis of the findings of the prior art it has been concluded that MKK4 and JNK1 inhibitors could be useful to treat JNK1-mediated diseases.

However, it has been recognized in clinical treatments that treatment of liver diseases with such compounds failed.

SUMMARY OF THE INVENTION

The problem underlying the invention was to provide useful compounds that are MKK4 inhibitors, in particular MKK4 inhibitors which selectively inhibit MKK4 over MKK7 and JNK1.

A further problem was to provide compounds that are MKK4 inhibitors which selectively inhibit MKK4 over MKK7 and JNK1, and which are useful for treating liver diseases and especially for promoting liver regeneration or reducing or preventing hepatocyte death.

This problem was solved by providing the compounds of formula (I).

Thus, the invention relates to the following embodiments:

1. A compound having formula (I)

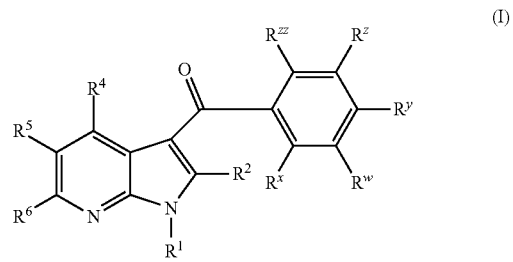

$R^1$ is H or alkyl;
$R^2$ is H or alkyl;
$R^4$ is H, or alkyl;
$R^6$ is H, or alkyl;
$R^w$ is —NR$^{10}$SO$_2$R$^{12}$;
$R^{10}$ is H, alkyl, or phenylalkyl;
$R^{12}$ is H, alkyl, haloalkyl or phenylalkyl, wherein the phenyl group is optionally substituted with 1 or 2 groups independently selected from alkyl and halogen;
$R^x$, $R^y$, $R^z$ and $R^{zz}$ are selected from:
a) $R^x$ and $R^y$ are F and $R^z$ and $R^{zz}$ are H; and
b) $R^x$, $R^y$ and $R^{zz}$ are independently halogen and $R^z$ is H;
$R^5$ is selected from
(a) phenyl which is substituted with 1, 2 or 3 groups independently selected from
—POdi(alkyl), and
hydroxyalkyl-ONH—CO—;
(b) pyrimidinyl which is substituted with 1, 2 or 3 groups independently selected from
alkyl,
cycloalkyl,
alkoxy, and
alkylsulfanyl,
and the pharmaceutically acceptable salts, solvates and optical isomers thereof.

2. A compound of embodiment 1, wherein $R^5$ is phenyl which is substituted with 1 or 2 groups independently selected from —POdi(alkyl), and hydroxyalkyl-ONH—CO—; and the pharmaceutically acceptable salts, solvates and optical isomers thereof.

3. A compound of embodiment 1, wherein $R^5$ is pyrimidinyl which is substituted with 1 or 2 groups independently selected from alkyl, cycloalkyl, alkoxy, and alkylsulfanyl; and the pharmaceutically acceptable salts, solvates and optical isomers thereof.

4. A compound of embodiment 3, wherein the pyrimidinyl is bound in 5-position to the 1H-pyrrolo[2,3-b]pyridine and is substituted in 2-position with alkyl, cycloalkyl, or alkoxy and optionally substituted in 4-position with alkyl or alkylsulfanyl; and the pharmaceutically acceptable salts, solvates and optical isomers thereof.

5. A compound of embodiment 4, wherein the pyrimidinyl is bound in 5-position to the 1H-pyrrolo[2,3-b]pyridine and is substituted in 2-position with cycloalkyl or alkyl, and the pharmaceutically acceptable salts, solvates and optical isomers thereof.

6. A compound of embodiment 3, wherein the pyrimidinyl is bound in 5-position to the 1H-pyrrolo[2,3-b]pyridine and is substituted with alkyl in 4-position or in 2- and 4-position, wherein the alkyl in 4- and in 6-position may be the same or different, and the pharmaceutically acceptable salts, solvates and optical isomers thereof.

7. A compound of any one of the preceding embodiments, wherein $R^{12}$ is $C_1$-$C_4$-alkyl or phenylalkyl, which phenylalkyl is in particular benzyl; and the pharmaceutically acceptable salts, solvates and optical isomers thereof.

8. A compound of embodiment 7, wherein $R^{12}$ is $C_1$-$C_4$-alkyl and preferably methyl, ethyl, or propyl; and the pharmaceutically acceptable salts, solvates and optical isomers thereof.

9. A compound of any one of the preceding embodiments having formula (Ia)

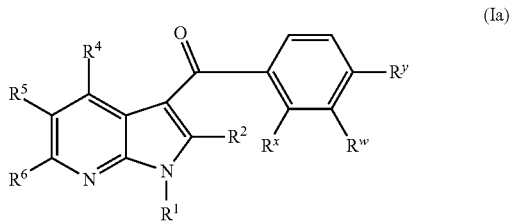

(Ia)

wherein $R^1$, $R^2$, $R^4$, $R^5$, $R^6$, $R^x$, $R^w$, and $R^y$ are as defined in any one of embodiments 1 to 8, and the pharmaceutically acceptable salts, solvates and optical isomers thereof.

10. A compound of any one of embodiments 1 to 8 having formula (Ib)

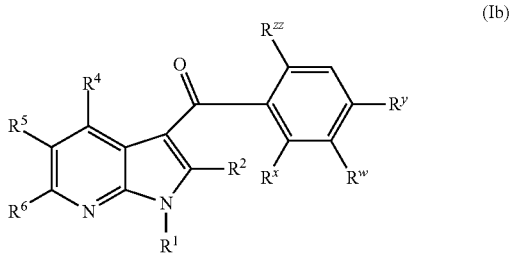

(Ib)

wherein $R^1$, $R^2$, $R^4$, $R^5$, $R^6$, $R^x$, $R^w$, $R^y$, and $R^{zz}$ are as defined in any one of embodiments 1 to 8, and the pharmaceutically acceptable salts, solvates and optical isomers thereof.

11. A compound of any one of the preceding embodiments, wherein $R^1$, $R^2$, $R^3$, $R^4$, and $R^6$ are H or alkyl, in particular H.

12. A compound of any one of the preceding embodiments, wherein $R^{10}$ is H or alkyl, in particular H.

DETAILED DESCRIPTION OF THE INVENTION

In an embodiment, the invention relates to selective MKK4 inhibitor compounds and the pharmaceutically acceptable salts, solvates and optical isomers thereof, wherein the compounds are of the formula I, wherein $R^1$ to $R^6$, $R^{10}$, A and Q are as defined in the above embodiments in any combination.

In an embodiment, the compounds of the invention and the pharmaceutically acceptable salts, solvates and optical isomers thereof selectively inhibit protein kinase MKK4 over protein kinases JNK1 and MKK7.

Further, the invention also relates to said compounds for use in promoting liver regeneration or reducing or preventing hepatocyte death and, at the same time, increasing hepatocyte proliferation.

The term "the compounds of the invention" or "the compounds of formula (I)" includes the pharmaceutically acceptable salts, prodrugs, biologically active metabolites, solvates and stereoisomers thereof.

The invention includes the pharmaceutically acceptable salts of the compounds mentioned above. The pharmaceutically acceptable salts are especially acid or base addition salts with pharmaceutically acceptable acids or bases. Examples of suitable pharmaceutically acceptable organic and inorganic acids are hydrochloric acid, hydrobromic acid, phosphoric acid, sulfuric acid, sulfamic acid, $C_1$-$C_4$-alkylsulfonic acids, such as methanesulfonic acid, cycloaliphatic sulfonic acids, such as S-(+)-10-camphor sulfonic acid, aromatic sulfonic acids, such as benzenesulfonic acid and toluenesulfonic acid, di- and tricarboxylic acids and hydroxycarboxylic acids having 2 to 10 carbon atoms, such as oxalic acid, malonic acid, maleic acid, fumaric acid, lactic acid, tartaric acid, citric acid, glycolic acid, adipic acid and benzoic acid. Other utilizable acids are described, e.g., in Fortschritte der Arzneimittelforschung [Advances in drug research], Volume 10, pages 224 ff., Birkhauser Verlag, Basel and Stuttgart, 1966. Examples of suitable pharmaceutically acceptable organic and inorganic bases are alkali metal hydroxides, such as sodium hydroxide or potassium hydroxide, alkaline earth metal hydroxides such as calcium or magnesium hydroxide, ammonium hydroxide, organic nitrogen bases such as dimethylamine, trimethylamine, ethanolamine, diethanolamine, triethanolamine, choline, 2-amino-2-hydroxymethyl-propane-1,3-diol, meglumine, procaine etc. L-arginine, L-lysine, ethylenediamine, or hydroxyethylpyrrolidine.

The invention also includes any tautomeric, crystal and polymorphic form of the compounds and salts of the present invention and mixtures thereof.

The invention also includes solvates such as hydrates.

The compounds of the invention may contain one or more chiral centers, and exist in different optically active forms such enantiomers and diastereomers.

As used herein, the term "pro-drug" refers to an agent which is converted into the parent drug in vivo by some physiological chemical process. An example, without limitation, of a pro-drug would be a compound of the present invention in the form of an ester.

Pro-drugs have many useful properties. For example, a pro-drug may be more water soluble than the ultimate drug, thereby facilitating intravenous administration of the drug. A pro-drug may also have a higher level of oral bioavailability than the ultimate drug. After administration, the prodrug is enzymatically or chemically cleaved to deliver the ultimate drug in the blood or tissue. Exemplary pro-drugs include, but are not limited to, compounds with carboxylic acid substituents wherein the free hydrogen is replaced by ($C_1$-$C_4$)alkyl, ($C_1$-$C_{12}$)alkanoyloxy-methyl, ($C_4$-$C_9$)1-(alkanoyloxy)ethyl, 1-methyl-1-(alkanoyloxy)-ethyl having from 5 to 10 carbon atoms, alkoxycarbonyloxymethyl having from 3 to 6 carbon atoms, 1-(alkoxycarbonyl-oxy)ethyl having from 4 to 7 carbon atoms, 1-methyl-1-(alkoxycarbonyloxy)-ethyl having from 5 to 8 carbon atoms, N-(alkoxycarbonyl) aminomethyl having from 3 to 9 carbon atoms, 1-(N-(alkoxycarbonyl)amino)ethyl having from 4 to 10 carbon atoms, 3-phthalidyl, 4-crotono-lactonyl, gamma-butyrolacton-4-yl, di-N,N—($C_1$-$C_2$)alkylamino($C_2$-$C_3$)alkyl (such as β-dimethylaminoethyl), carbamoyl-($C_1$-$C_2$)alkyl, N,N-di ($C_1$-$C_2$)-alkylcarbamoyl-($C_1$-$C_2$)alkyl and piperidino-, pyrrolidino- or morpholino($C_2$-$C_3$)alkyl. Other exemplary prodrugs release an alcohol of Formula (I) wherein the free hydrogen of the hydroxyl substituent (e.g., R group contains hydroxyl) is replaced by ($C_1$-$C_6$)alkanoyloxy-methyl, 1-(($C_1$-$C_6$)alkanoyloxy)-ethyl, 1-methyl-1-(($C_1$-$C_6$)alkanoyloxy)ethyl, ($C_1$-$C_{12}$)alkoxy-carbonyloxy-methyl, N—($C_1$-$C_6$)-alkoxy-carbonylaminomethyl, succinoyl, ($C_1$-$C_6$)alkanoyl, α-amino($C_1$-$C_4$)alkanoyl, arylactyl and α-aminoacyl, or α-aminoacyl-α-aminoacyl wherein said α-aminoacyl moieties are independently any of the naturally occurring L-amino acids found in proteins, P(O)(OH)$_2$, —P(O)(O($C_1$-$C_6$)alkyl)$_2$ or glycosyl (the radical resulting from detachment of the hydroxyl of the hemiacetal of a carbohydrate).

The expression MKK4 inhibitor means that, upon administration, the kinase activity of MKK4 is inhibited with an IC$_{50}$ of <10 μmol/l, preferably <1 μmol/l, and in particular <0.5 μmol/l. The expression "selectively inhibit protein kinase MKK4 over protein kinases JNK1 and MKK7" as used herein means that the ratio of MKK7 inhibiting activity to MKK4 inhibiting activity or the ratio of JNK1 inhibiting activity to MKK4 inhibiting activity, expressed as either percent of control or Kd, is ≥10, as measured with KINOMEscan™.

The expression "promoting liver regeneration or reducing or preventing hepatocyte death" as used herein means an increase in the relative number of proliferating hepatocytes by at least 30%, preferably at least 50%, as compared to the number of proliferating cells at the beginning of therapy. In particular, the expression means an increase by 100% when compared to the number of proliferating cells at the beginning of therapy. In this context, the experimental determination and quantification will be performed using standard methods, e.g. the quantification of the protein Ki67, which is strictly associated with cell proliferation. For quantification of proliferating hepatocytes in a tissue slide, several immunohistochemical standard methods are available, which use a primary anti-Ki67 antibody followed by visualization of anti-Ki67-binding by using, for example, a horseradish peroxidase conjugated secondary antibody. The amount of peroxidase activity, which is visualized by enzymatic conversion of chromogenic substrates, correlates with the amount of Ki67 protein and the number of proliferating cells.

In the experiments described below, hepatocyte proliferation was quantified by Ki67-staining using the primary polyclonal rabbit anti-Ki67 antibody from Abcam (article no. ab15580, Abcam, Cambridge, USA) and the fluorophore tetramethylrhodamine containing secondary goat polyclonal antibody from Invitrogen (article no. 16101, Invitrogen/ThermoFisher). Based on data obtained from several preclinical mouse models it was found that shRNA (small hairpin RNA) mediated suppression of MKK4 in a chronic CCl$_4$ (carbon tetrachloride) mediated liver damage mouse model increased hepatocyte proliferation from 13% to 27% (compared to a control shRNA) and was associated with decreased liver damage (transaminases) and decreased liver fibrosis. According to the definition in the previous chapter, the relative increase of proliferating cells was 108%. In a model of alcohol induced steatohepatitis (ASH), shRNA mediated silencing of MKK4 resulted in a hepatocyte proliferation rate of 4% as compared to 2% when a control shRNA was used (relative increase: 100%). The duplication of hepatocyte proliferation was associated with decreased steatosis (fat deposition) and decreased liver damage as measured by transaminases. Along the same lines, shRNA mediated MKK4 silencing increased hepatocyte proliferation from 16% (control shRNA) to 33% (relative increase: 106%) in a model of partial hepatectomy (48 hrs after surgical removal of two thirds of the liver). Again, increased hepatocyte proliferation was associated with improved liver regeneration and a faster restoration of liver mass.

The organic moieties mentioned in the above definitions of the variables are—like the term halogen—collective terms for individual listings of the individual group members. The prefix $C_n$-$C_m$ indicates in each case the possible number of carbon atoms in the group.

The term halogen denotes in each case fluorine, bromine, chlorine or iodine, in particular fluorine or chlorine.

Alkyl is a straight-chain or branched alkyl group which is preferably a $C_1$-$C_6$-alkyl group, i.e. an alkyl group having from 1 to 6 carbon atoms, and more preferably a $C_1$-$C_4$-alkyl group. Examples of an alkyl group are methyl, ethyl, n-propyl, iso-propyl, n-butyl, 2-butyl, iso-butyl, tert-butyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl.

The definition of alkyl is likewise applicable to any group which includes an alkyl group.

Cycloalkyl is a cycloaliphatic radical which is preferably $C_3$-$C_3$-cycloalkyl, i.e. a cycloalkyl group having from 3 to 8 carbon atoms. In particular, 3 to 6 carbon atoms form the cyclic structure, such as cyclopropyl, cyclobutyl, cyclopentyl and cyclohexyl. The cyclic structure may be unsubstituted or may carry 1, 2, 3 or 4 $C_1$-$C_4$ alkyl radicals, preferably one or more methyl radicals.

The compounds of the invention including the pharmaceutically acceptable salts, prodrugs, biologically active metabolites, solvates and stereoisomers thereof, can be prepared as disclosed in WO 2007/002433 which is incorporated herein in its entirety by reference or according to analogous procedures. The acid or base addition salts are prepared in a customary manner by mixing the free base with a corresponding acid or by mixing the free acid with the desired base. Optionally, the reaction is carried out in solution in an organic solvent, for example a lower alcohol, such as methanol, ethanol or propanol, an ether, such as methyl tert-butyl ether or diisopropyl ether, a ketone, such as acetone or methyl ethyl ketone, or an ester, such as EtOAc.

The compounds of the invention are useful for promoting liver regeneration or reducing or preventing hepatocyte death and, at the same time, increasing hepatocyte proliferation. The compounds are therefore useful in treating, modulating, improving or preventing diseases which involve acute or chronic damages to the liver that may be caused by infection, injury, exposure to toxic compounds, an abnormal build-up of normal substances in the blood, an autoimmune process, a genetic defect or unknown causes.

Such liver diseases comprise all diseases where increased liver regeneration and reduction or prevention of hepatocyte death may be helpful to achieve a potential therapeutic effect, i.e. partial or complete restoration of liver functions. Such diseases comprise
  acute and chronic or acute on chronic liver diseases such as acute and chronic viral hepatitis like hepatitis B, C, E, hepatitis caused by Epstein-Barr virus, cytomegalovirus, herpes simplex virus and other viruses, all types of autoimmune hepatitis, primary sclerosing hepatitis, alcoholic hepatitis;

metabolic liver diseases such as metabolic syndrome, fatty liver like non-alcoholic fatty liver (NAFL), non-alcoholic steatohepatitis (NASH), alcoholic steatohepatitis (ASH), Morbus Wilson, Hemochromatosis, alpha1-antitrypsin deficiency, glycogen storage diseases;

all types of liver cirrhosis, such as primary biliary cirrhosis, ethyl toxic liver cirrhosis, cryptogenic cirrhosis;

acute (fulminant) or chronic liver failure such as toxic liver failure like acetaminophen (paracetamol) induced liver failure, alpha-amanitin induced liver failure, drug induced hepatotoxicity, liver failure caused, for example, by antibiotics, nonsteroidal anti-inflammatory drugs and anticonvulsants, acute liver failure induced by herbal supplements (kava, ephedra, skullcap, pennyroyal etc), liver disease and failure due to vascular diseases such as Budd-Chiari syndrome, acute liver failure of unknown origin, chronic liver disease due to right heart failure;

galactosemia, cystic fibrosis, porphyria, hepatic ischemia perfusion injury, small for size syndrome after liver transplantation, primary sclerosing cholangitis or hepatic encephalopathy.

For promoting liver regeneration or reducing or preventing hepatocyte death the compounds of the invention are administered to a patient in need thereof in a therapeutically effective amount. Various diagnostic methods are available to detect the presence of a liver disease. Blood levels of alanine aminotransferase (ALT) and aspartate aminotransferase (AST), above clinically accepted normal ranges, are known to be indicative of on-going liver damage. Blood bilirubin levels or other liver enzymes may be used as detection or diagnostic criteria. Routine monitoring of liver disease patients for blood levels of ALT and AST is used to measure progress of the liver disease while on medical treatment. Reduction of elevated ALT and AST levels to within the accepted normal range is taken as clinical evidence reflecting a reduction in the severity of the patients' liver damage. Commercial assays such as FibroTest/FibroSURE, HepaScore®, FibroMeter or Cirrhometer evaluate the combined results of five and more biochemical parameters for the detection of liver steatosis, fibrosis and cirrhosis. Furthermore, non-invasive, innovative physical imaging techniques such as magnetic resonance imaging, sonography and, in particular, elastography techniques are available to detect and monitor the status and progression of liver diseases.

It has further been found that shRNA mediated MKK4 suppression attenuate TNF-α-driven cartilage matrix degradation in osteoarthritis (Cell Death and Disease (2017) 8, e3140). Therefore, inhibition of the activity of MKK4 using the compounds of the invention are further useful for treating osteoarthritis and rheumatoid arthritis.

The compounds of the invention are customarily administered in the form of pharmaceutical compositions which comprise at least one compound according to the invention, optionally together with an inert carrier (e.g. a pharmaceutically acceptable excipient) and, where appropriate, other drugs. These compositions can, for example, be administered orally, rectally, transdermally, subcutaneously, intraperitoneally, intravenously, intramuscularly or intranasally.

Examples of suitable pharmaceutical compositions are solid medicinal forms, such as powders, granules, tablets, in particular film tablets, lozenges, sachets, cachets, sugar-coated tablets, capsules, such as hard gelatin capsules and soft gelatin capsules, or suppositories, semisolid medicinal forms, such as ointments, creams, hydrogels, pastes or plasters, and also liquid medicinal forms, such as solutions, emulsions, in particular oil-in-water emulsions, suspensions, for example lotions, injection preparations and infusion preparations. In addition, it is also possible to use liposomes or microspheres.

When producing the compositions, the compounds according to the invention are optionally mixed or diluted with one or more carriers (excipients). Carriers (excipients) can be solid, semisolid or liquid materials which serve as vehicles, carriers or medium for the active compound.

Suitable carriers (excipients) are listed in the specialist medicinal monographs. In addition, the formulations can comprise pharmaceutically acceptable auxiliary substances, such as wetting agents; emulsifying and suspending agents; preservatives; antioxidants; antiirritants; chelating agents; coating auxiliaries; emulsion stabilizers; film formers; gel formers; odor masking agents; taste corrigents; resins; hydrocolloids; solvents; solubilizers; neutralizing agents; diffusion accelerators; pigments; quaternary ammonium compounds; refatting and overfatting agents; raw materials for ointments, creams or oils; silicone derivatives; spreading auxiliaries; stabilizers; sterilants; suppository bases; tablet auxiliaries, such as binders, fillers, glidants, disintegrants or coatings; propellants; drying agents; opacifiers; thickeners; waxes; plasticizers and white mineral oils. A formulation in this regard is based on specialist knowledge as described, for example, in Fiedler, H. P., Lexikon der Hilfsstoffe für Pharmazie, Kosmetik und angrenzende Gebiete [Encyclopedia of auxiliary substances for pharmacy, cosmetics and related fields], $4^{th}$ edition, Aulendorf: ECV-Editio-Cantor-Verlag, 1996.

The compounds of the invention may also be suitable for combination with other therapeutic agents. The invention therefore further relates to a combination comprising a compound of the invention with one or more further therapeutic agents, in particular for use in promoting liver regeneration or reducing or preventing hepatocyte death. The combination therapies of the invention may be administered adjunctively. By adjunctive administration is meant the coterminous or overlapping administration of each of the components in the form of separate pharmaceutical compositions or devices. This regime of therapeutic administration of two or more therapeutic agents is referred to generally by those skilled in the art and herein as adjunctive therapeutic administration; it is also known as add-on therapeutic administration. Any and all treatment regimes in which a patient receives separate but coterminous or overlapping therapeutic administration of the compounds of the invention and at least one further therapeutic agent are within the scope of the current invention. In one embodiment of adjunctive therapeutic administration as described herein, a patient is typically stabilized on a therapeutic administration of one or more of the components for a period of time and then receives administration of another component.

The combination therapies of the invention may also be administered simultaneously. By simultaneous administration is meant a treatment regime wherein the individual components are administered together, either in the form of a single pharmaceutical composition or device comprising or containing both components, or as separate compositions or devices, each comprising one of the components, administered simultaneously. Such combinations of the separate individual components for simultaneous combination may be provided in the form of a kit-of-parts.

Suitable agents for use in combination with the compounds of the inventions include for example:

ACC inhibitors such as TOFA (5-(tetradecyloxy)-2-furoic acid), firsocostat (formerly known as GS 0976), PF-05221304 and ACC inhibitors as disclosed in WO 2016/112305, angiotensin II receptor antagonists, angiotensin converting enzyme (ACE) inhibitors, such as enalapril, ASK1 (Apoptosis signal-regulating kinase 1, MAP3K5) inhibitors such as selonsertib (formerly known as GS-4997) or SRT-015 caspase inhibitors, such as emricasan, cathepsin B inhibitors, such as a mixed cathepsin B/hepatitis C virus NS3 protease inhibitor. like VBY-376, CCR2 chemokine antagonists, such as a mixed CCR2/CCR5 chemokine antagonist like cenicriviroc, CCR5 chemokine antagonists, chloride channel stimulators, such as cobiprostone, cholesterol solubilizers, copper amine oxidase 3 (AOC3) inhibitors, such as BI 1467335 (formerly known as PXS-4728A)

diacylglycerol O-acyltransferase 1 (DGAT1) inhibitors, such as LCQ908 or GSK-3008356, diacylglycerol O-acyltransferase 2 (DGAT2) inhibitors, such as PF-06865571, dipeptidyl peptidase IV (DPPIV) inhibitors, such as linagliptin, farnesoid X receptor (FXR) agonists, such as INT-747 (obeticholic acid), cliofexor (formerly known as GS-9674 or PX-102), tropifexor (formerly known as LJN452), EDP-305 or LMB-763, Fibroblast growth factors (FGF) and analogues thereof, such long-acting analogues of FGF19 (e.g. aldafermin, formerly known as NGM-282) or long-acting analogues of FGF21 (e.g. TEV-47948, also denominated Bio89-100, or ARK01 or PF-05231023)

FXR/TGR5 dual agonists, such as INT-767, galectin-3 inhibitors, such as GR-MD-02, glucagon-like peptide 1 (GLP1) agonists, such as liraglutide or exenatide, glucagon-like peptide 1 (GLP1)/glucagon dual agonists, such as cotadutide, dual glucose-dependent insulinotropic polypeptide (GIP) and glucagon-like peptide-1 (GLP-1) receptor agonists such as tirzepatide (formerly known as LY3298176)

glutathione precursors, hepatitis C virus NS3 protease inhibitors, such as a mixed cathepsin B/hepatitis C virus NS3 protease inhibitor like VBY-376, HMG CoA reductase inhibitors, such as a statin like atorvastatin, 11β-hydroxysteroid dehydrogenase (11β-HSD1) inhibitors, such as R05093151, IL-1β antagonists, IL-6 antagonists, such as a mixed IL-6/IL-1β/TNFα ligand inhibitor like BLX-1002, IL-10 agonists, such as peg-ilodecakin, anti-IL-11 antibodies or IL-11 antagonists IL-17 antagonists, such as KD-025, ileal sodium bile acid cotransporter inhibitors, such as volixibat (formerly known as SHP-626), integrin inhibitors, such as selective αvβ1-inhibitors (e.g. PLN-1474 or those reviewed in Wilkinson et al., Eur. J. Pharmacol., 842, 239-247 (2019)), ketohexokinase inhibitors such as PF-06835919 leptin analogs, such as metreleptin, 5-lipoxygenase inhibitors, such as a mixed 5-lipoxygenase/PDE3/PDE4/PLC inhibitor like tipelukast, LPL gene stimulators, such as alipogene tiparvovec, lysyl oxidase homolog 2 (LOXL2) inhibitors, such as an anti-LOXL2 antibody like simtuzumab (formerly known as GS-6624) or small molecule inhibitors such as those disclosed in WO 2017/136870, nod-like receptor family pyrin domain containing 3 (NLRP3) inflammasome small molecule inhibitors, such as MCC950, omega-3 polyunsaturated fatty acids and derivitaives thereof, such as icosabutate and examples disclosed in U.S. Pat. No. 8,735,436 B2, oxysterol sulfates, such as 25-hydroxycholesterol 3-sulfate and 25-hydroxy-cholesterol 3, 25-disulfate, PDE4 inhibitors, such as ASP-9831

PPARα agonists, such as a mixed PPARα/δ agonist elafibranor (formerly known as GFT-505), the mixed PPARα/γ/δ agonist lanifibranor or the mixed PPARα/γ agonist saroglitazar), PPARγ agonists, such as pioglitazone, PPARδ agonists such as seladelpar, Rho associated protein kinase 2 (ROCK2) inhibitors, such as KD-025, sodium glucose transporter-2 (SGLT2) inhibitors, such as remogliflozin etabonate, sodium glucose transporter-1/2 (SGLT1/2) inhibitors such as licogliflozin stearoyl CoA desaturase-1 inhibitors, such as aramchol or CVT-12805, thyroid hormone receptor B agonists, such as MGL-3196 or VK2809, tumor necrosis factor α (TNFα) ligand inhibitors, transglutaminase inhibitors and transglutaminase inhibitor precursors, such as mercaptamine, PTPIb inhibitors, such as A119505, A220435, A321842, CPT633, ISIS-404173, JTT-551, MX-7014, MX-7091, MX-7102, NNC-521246, OTX-001, OTX-002, orTTP814, and Namacizumab, an antibody, which stabilizes the cannabinoid 1 receptor (CB1) in an inactive conformation.

In some embodiments, the one or more further therapeutic agents are selected from acetylsalicylic acid, alipogene tiparvovec, aramchol, atorvastatin, BLX-1002, cenicriviroc, cobiprostone, colesevelam, emricasan, enalapril, GFT-505, GR-MD-02, hydrochlorothiazide, icosapent ethyl ester (ethyl eicosapentaenoic acid), IMM-124E, KD-025, linagliptin, liraglutide, mercaptamine, MGL-3196, obeticholic acid, olesoxime, peg-ilodecakin, pioglitazone, GS-9674, remogliflozin etabonate, SHP-626, solithromycin, tipelukast, TR$^x$-318, ursodeoxycholic acid, and VBY-376.

In some embodiments, one of the one or more further therapeutic agents is selected from acetylsalicylic acid, alipogene tiparvovec, aramchol, atorvastatin, BLX-1 002, and cenicriviroc.

In an embodiment the invention relates to a method of inhibiting protein kinase MKK4, selectively inhibiting protein kinase MKK4 over protein kinases JNK1 and MKK7, promoting liver regeneration or preventing hepatocyte death, treating acute, acute-on-chronic or chronic liver disease, treating acute and chronic or acute on chronic liver diseases such as acute and chronic viral hepatitis like hepatitis B, C, E, hepatitis caused by Epstein-Barr virus, cytomegalovirus, herpes simplex virus and other viruses, all types of autoimmune hepatitis, primary sclerosing hepatitis, alcoholic hepatitis;

treating metabolic liver diseases such as metabolic syndrome, fatty liver like non-alcoholic fatty liver (NAFL), non-alcoholic steatohepatitis (NASH), alcoholic steatohepatitis (ASH), Morbus Wilson, hemochromatosis, alpha1-antitrypsin deficiency, glycogen storage diseases;

treating all types of liver cirrhosis, such as primary biliary cirrhosis, ethyl toxic liver cirrhosis, cryptogenic cirrhosis;

treating acute (fulminant) or chronic liver failure such as toxic liver failure like acetaminophen (paracetamol) induced liver failure, alpha-amanitin induced liver failure, drug induced hepatotoxicity and liver failure caused, for example, by antibiotics, nonsteroidal anti-inflammatory drugs, anticonvulsants, acute liver failure induced by herbal supplements (kava, ephedra, skullcap, pennyroyal etc.), liver disease and failure due to vascular diseases such as Budd-Chiari syndrome, acute liver failure of unknown origin, chronic liver disease due to right heart failure;

treating galactosemia, cystic fibrosis, porphyria, hepatic ischemia perfusion injury, small for size syndrome after liver transplantation, primary sclerosing cholangitis or hepatic encephalopathy, or treating osteoarthritis or rheumatoid arthritis, which comprises administering an effective amount of a compound or a composition as defined above to a subject in need thereof.

In an embodiment, the compounds of the invention are administered in a dosage of 0.2 to 15 mg/kg or 0.5 to 12 mg/kg of the subject being treated. The compounds can be administered once or several times a day. The compounds are administered over 4 to 12 weeks.

The following examples illustrate the invention without limiting it.

EXAMPLES

Abbreviations

ATP adenosintriphosphate
DCM dichloromethane
4-DMAP (4-)dimethylaminopyridine
DMA dimethylacetamide
DMF dimethylformamide
DMSO dimethylsulfoxide
DPPA diphenylphosphoryl azide
DTT dithiothreitol
EtOH ethanol
EtOAc ethyl acetate
FCC flash column chromatography
HEPES 2-(4-(2-hydroxyethyl)-1-piperazinyl)-ethansulfonssure
HOBt hydroxybenzotriazole
HPLC high performance liquid chromatography
IPA isopropylalcohol (or iPrOH)
LCMS liquid chromatography mass spectroscopy
MeCN acetonitrile
MeOH methanol
NaHCO$_3$ sodium hydrogencarbonate
NBS N-bromosuccinimide
NMP N-methylpyrrolidone
NMR nuclear magnetic resonance
Pd(dppf)Cl$_2$ [1,1'-Bis(diphenylphosphino)ferrocene]palladium(II)dichloride PE petrolether
rt or RT room temperature
TEA triethylamine
TFA trifluoroacetic acid
THF tetrahydrofurane
TLC thin layer chromatography Examples Example 01: Synthesis of 2,4-difluoro-3-nitrobenzoic acid Chemical Formula: C$_7$H$_3$F$_2$NO$_4$ (MW: 203.10)

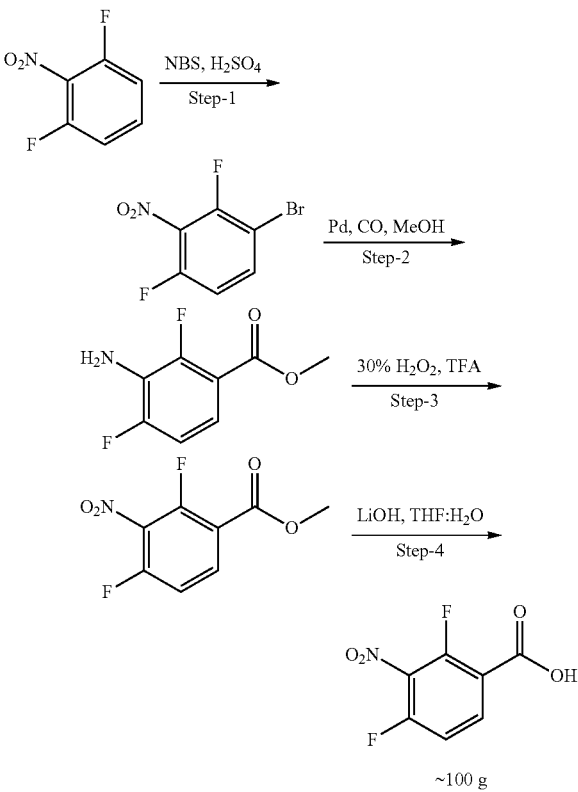

Step 1: Synthesis of 1-bromo-2,4-difluoro-3-nitrobenzene

To a stirred solution of 1,3-difluoro-2-nitrobenzene (1 eq., 50.0 g, 314.29 mmol) in H$_2$SO$_4$ (400 mL), NBS (1.20 eq., 67.12 g, 377.14 mmol) was added and the reaction mixture was heated to 80° C. for 16 h. The reaction was monitored by TLC (100% hexane) and after completion, the reaction mixture was poured into ice cold water and extracted with EtOAc (2 L). The organic layer was separated and washed with saturated NaHCO$_3$ solution and brine. The organic layer was dried over anhydrous sodium sulfate and concentrated under reduced pressure. The crude product was purified by FCC (gradient 1-5% EtOAc in n-hexane) to afford 1-bromo-2,4-difluoro-3-nitrobenzene (50 g, 67%) as yellow liquid.

Analytical Data: $^1$H NMR (400 MHz, CDCl$_3$) δ 7.78-7.71 (m, 1H), 7.09-7.03 (m, 1H).

Step 2: Synthesis of methyl 3-amino-2,4-difluorobenzoate

A stirred solution of 1-bromo-2,4-difluoro-3-nitrobenzene (1 eq., 60.0 g, 252.21 mmol) in MeOH (1000 mL) was degassed with nitrogen for 15 min. TEA (5 eq., 127.49 g, 1261.03 mmol) was added and the reaction mixture was degassed for another 5 min. Pd(dppf)Cl$_2$×DCM (0.10 eq., 20.58 g, 25.22 mmol) was added and the reaction mixture was flushed with carbon monoxide two times. The reaction mixture was stirred at RT for 30 min and further heated to 100° C. for 12 h under carbon monoxide (200 psi). The reaction was monitored by TLC (100% DCM). After completion, the reaction mixture was filtered through a pad of Celite, volatiles were removed under reduced pressure. To the crude diethyl ether was added and stirred for 30 min at RT, filtered through a pad of Celite, volatiles were removed under reduced pressure to afford methyl 3-amino-2,4-difluorobenzoate (38.0 g, crude) as yellow syrup.

Analytical Data: $^1$H NMR (400 MHz, DMSO-d$_6$) δ 7.08-6.96 (m, 2H), 5.46 (s, 2H), 3.81 (s, 3H)

Step 3: Synthesis of methyl 2,4-difluoro-3-nitrobenzoate

30% H$_2$O$_2$ (68.40 mL) was stirred and a solution of methyl 3-amino-2,4-difluorobenzoate (19.0 g, 101.52 mmol) in TFA (205 mL) was added dropwise at RT over a period of 60 min. The reaction mixture was stirred at 80° C. for 1 h. The reaction was monitored by TLC (30% EtOAc in hexane). After completion, the reaction mixture was poured into crushed ice, the obtained precipitate was filtered and washed with water. The crude compound was dried under vacuum to afford methyl 2,4-difluoro-3-nitrobenzoate (19.0 g, crude) as light brown solid which was used in the next reaction without any further purification.

Analytical Data: $^1$H NMR (400 MHz, DMSO-d$_6$) δ 8.30-8.21 (m, 1H), 7.62 (t, J=9.29 Hz, 1H), 3.90 (d, J=0.98 Hz, 3H).

Step 4: Synthesis of 2,4-difluoro-3-nitrobenzoic acid

To a stirred solution of methyl 2,4-difluoro-3-nitrobenzoate (19.0 g, 87.51 mmol) in THF (200 mL), LiOH×H$_2$O (1.20 eq., 4.40 g, 105.01 mmol) dissolved in H$_2$O (100 mL) was added portion wise over 30 min. at RT and the reaction mixture was further stirred at RT for 3 h. The reaction was monitored by TLC (10% MeOH in DCM). After completion, the reaction mixture was neutralised with 1N HCl solution and concentrated under reduced pressure. The crude obtained was acidified with 1N HCl solution and extracted with EtOAc. The organic layer was separated, dried over anhydrous sodium sulfate, filtered and concentrated under reduced pressure to afford 2,4-difluoro-3-nitrobenzoic acid (15.50 g, crude) as an off-white solid.

Analytical Data: $^1$H NMR (400 MHz, DMSO-d6) δ 13.85 (brs, 1H), 8.27-8.16 (m, 1H), 7.62-7.53 (m, 1H).

Example 02: Synthesis of N-(3-(1-(2,6-dichlorobenzoyl)-5-(4,4,5,5-tetramethyl-1,3,2-dioxaborolan-2-yl)-1H-pyrrolo[2,3-b]pyridine-3-carbonyl)-2,6-difluorophenyl)propane-1-sulfonamide Chemical Formula: C$_{30}$H$_{28}$BCl$_2$F$_2$N$_3$O$_6$S (MW: 678.34)

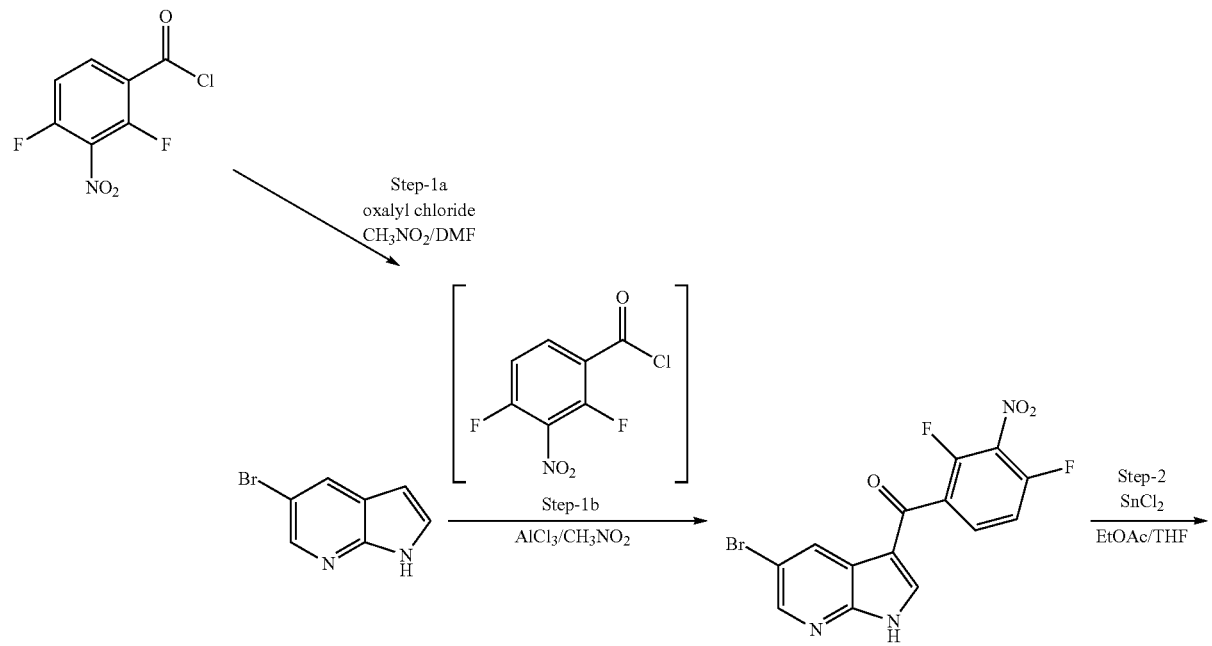

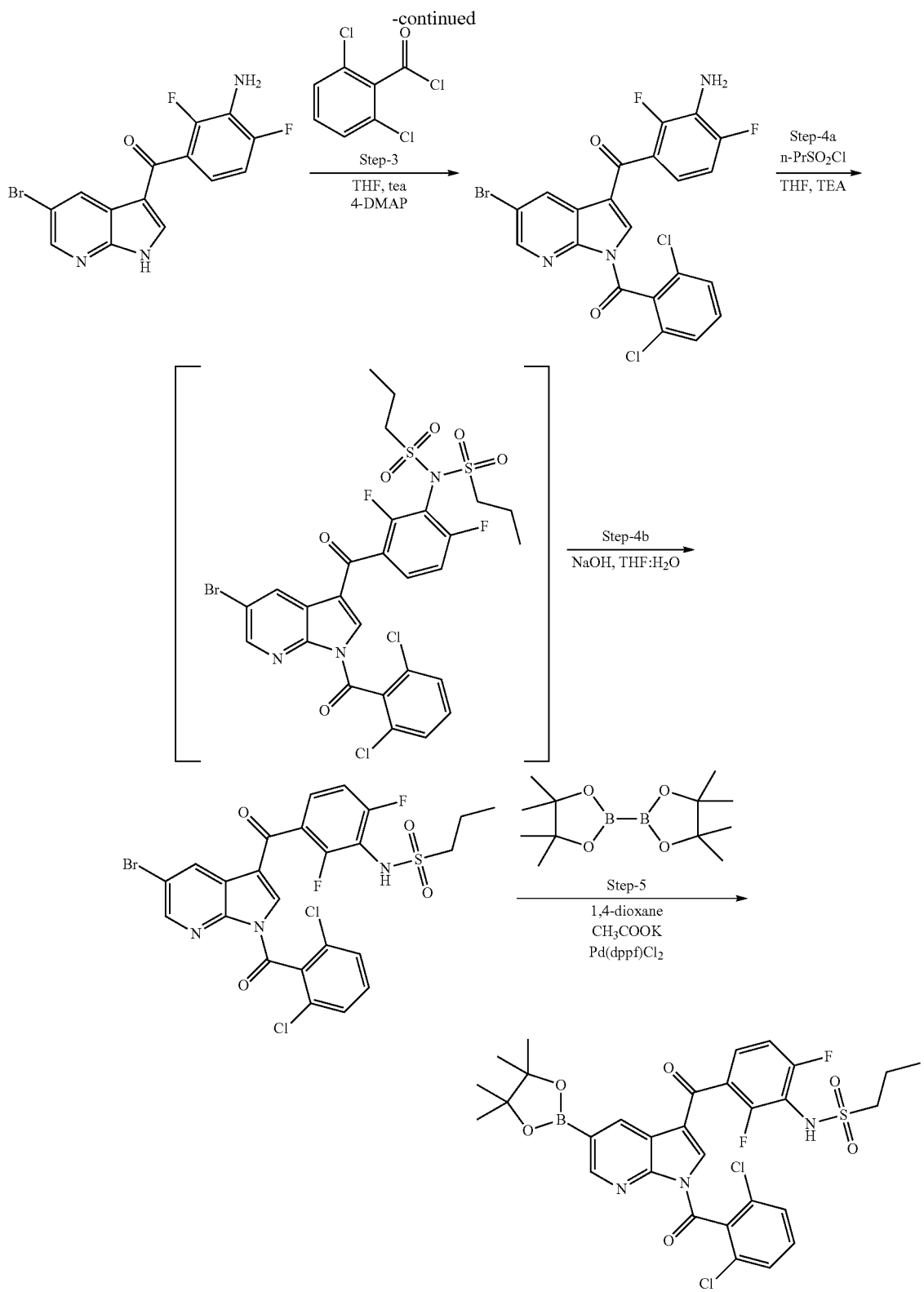
Step 1: Synthesis of (5-bromo-1H-pyrrolo[2,3-b]pyridin-3-yl)(2,4-difluoro-3-nitrophenyl)methanone
Step 1a: 2,4-difluoro-3-nitrobenzoic acid (12.4 g, 60.9 mmol) was suspended in nitromethane (50 ml, 20% of entire volume), oxalyl chloride (5.44 mL, 63.4 mmol) and DMF (0.197 mL, 2.54 mmol) were added dropwise.
Step 1b: In a second flask 5-bromo-1H-pyrrolo[2,3-b]pyridine (10 g, 50.8 mmol) and aluminium chloride (33.8 g, 254 mmol) were dissolved in nitromethane (204 ml, 80% of the entire volume) and stirred for approx. 1 h. The solution with the in situ generated 2,4-difluoro-3-nitrobenzoyl chloride was added to the second flask over a period of 10 min. The solution was stirred at 55° C. overnight. TLC analysis indicated completion of the reaction. The mixture was cooled to 0° C. and after dropwise addition of MeOH (102 ml), the product started precipitating. Water (169 ml) was added and the precipitate was filtered off and dried in vacuo. The product was obtained as a beige solid (15.2 g; 75% yield; 95% purity).

Analytical Data: $^1$H NMR (400 MHz, DMSO-$d_6$) δ 13.12 (br s, 1H), 8.64 (d, J=2.45 Hz, 1H), 8.52-8.48 (m, 1H), 8.38-8.34 (m, 1H), 8.07-7.99 (m, 1H), 7.64 (t, J=9.29 Hz, 1H).

Step 2: Synthesis of (3-amino-2,4-difluorophenyl)(5-bromo-1H-pyrrolo[2,3-b]pyridin-3-yl)methanone (5-bromo-1H-pyrrolo[2,3-b]pyridin-3-yl)-(2,4-difluoro-3-nitrophenyl)methanone (15.1 g, 37.5 mmol) was suspended in EtOAc (659 mL) and THF (659 mL). The mixture was heated to 60° C. and tin(II) chloride dihydrate (29.6 g, 131 mmol) was added portion wise. After 2 days stirring, TLC analysis indicated complete reaction. The mixture was cooled to RT and a half saturated NaHCO$_3$ solution was added. The precipitate was filtered off over a pad of sea sand and celite. The filtrate was washed with brine, dried over sodium sulphate and the solvent was evaporated under reduced pressure. The solid was suspended in MeCN (50 ml), filtered off and dried in vacuo. (3-amino-2,4-difluorophenyl)-(5-bromo-1H-pyrrolo[2,3-b]pyridin-3-yl)methanone (11.9 g, 31.8 mmol, 85% yield) was obtained as light orange solid.

Step 3: Synthesis of (3-(3-amino-2,4-difluorobenzoyl)-5-bromo-1H-pyrrolo[2,3-b]pyridin-1-yl)(2,6-dichlorophenyl)methanone To an ice bath cooled solution of (3-amino-2,4-difluorophenyl)-(5-bromo-1H-pyrrolo[2,3-b]pyridin-3-yl)methanone (11.9 g, 31.7 mmol) in THF (338 mL), TEA (4.65 mL, 33.3 mmol) was added. 2,6-dichlorobenzoyl chloride (4.60 mL, 32.1 mmol) was added dropwise followed by 4-dimethylaminopyridine (0.194 g, 1.59 mmol). The ice bath was removed and the mixture was stirred at RT until complete consumption of the starting material. The solvent volume was reduced to approx. 1/10 vol. and the residue was diluted with EtOAc (500 ml). The organic phase was washed twice with 1M HCl (100 ml each), once with brine (100 ml) and dried over sodium sulphate. The solvent was removed under reduced pressure and the residue was dissolved in THF (66 ml). n-Heptane (330 ml) was added portion wise under vigorous stirring and after completion, stirring was continued for 1 h at RT. The precipitate was filtered off and dried in vacuo. (3-amino-2,4-difluorophenyl)-[5-bromo-1-(2,6-dichlorobenzoyl) pyrrolo[2,3-b]pyridin-3-yl]methanone was obtained as a beige solid (14.7 g, 26.5 mmol, 84% yield).

Step 4: Synthesis of N-(3-(5-bromo-1-(2,6-dichlorobenzoyl)-1H-pyrrolo[2,3-b]pyridine-3-carbonyl)-2,6-difluorophenyl)propane-1-sulfonamide Step 4a: To a cooled (−10° C., MeOH/ice) solution of (3-amino-2,4-difluorophenyl)-[5-bromo-1-(2,6-dichlorobenzoyl)pyrrolo[2,3-b]pyridin-3-yl]methanone (8.00 g, 14.5 mmol) in THF (76.2 mL), TEA (15.5 mL, 111 mmol) was added. A solution of 1-propanesulfonyl chloride (3.58 mL, 31.8 mmol) in THF (3.6 mL) was added dropwise and the reaction mixture was stirred at −10° C. until TLC showed completion.

Step 4b: To the cold solution, 2N NaOH (8 eq., 61 mL) was added and the solution was warmed to RT. After TLC revealed complete hydrolysis of the disulfonamide the mixture was acidified with 1M HCl (pH=2) and extracted twice with EtOAc. The combined organic phases were dried over sodium sulfate and the solvent was removed in vacuo. The residue was dissolved in EtOAc (50 mL) and treated with n-pentane until no further precipitate was formed. The solid was filtered off and dried in vacuo (main fraction of product). The filtrate was concentrated under reduced pressure and purified via flash chromatography using PE/EE 30% as eluent (second fraction of product).

Step 5: Synthesis of (3-(3-amino-2,4-difluorobenzoyl)-5-(4,4,5,5-tetramethyl-1,3,2-dioxaborolan-2-yl)-1H-pyrrolo[2,3-b]pyridin-1-yl)(2,6-dichlorophenyl)methanone To a stirred solution of (3-(3-amino-2,4-difluorobenzoyl)-5-bromo-1H-pyrrolo[2,3-b]pyridin-1-yl)(2,6-dichlorophenyl)methanone (1 eq., 7.0 g, 13.33 mmol) in dry 1,4-dioxane (100 mL), bis(pinacolato)diboron (1.20 eq, 4.06 g, 16.00 mmol) was added followed by addition of potassium acetate (fused, 2.50 eq, 3.28 g, 33.33 mmol). Pd(dppf)Cl$_2$×DCM (0.05 eq, 0.54 g, 0.67 mmol) was added to the mixture and stirring was continued at 80° C. for 3 h. The progress of the reaction was monitored by TLC (20% EtOAc in hexane) and LC-MS. After completion, the reaction mixture was cooled to RT and filtered through a pad of Celite. The resulting organic layer was concentrated under reduced pressure. The obtained crude product was dissolved in diethyl ether (200 mL), filtered and the organic layer was concentrated under reduced pressure. Trituration of the crude product with acetonitrile followed by filtration afforded (3-(3-amino-2,4-difluorobenzoyl)-5-(4,4,5,5-tetramethyl-1,3,2-dioxaborolan-2-yl)-1H-pyrrolo[2,3-b]pyridin-1-yl)(2,6-dichlorophenyl)methanone 5 (7.0 g,) as light brown solid

Example 03: Synthesis of 4-(3-(2,4-difluoro-3-(propylsulfonamido)benzoyl)-1H-pyrrolo[2,3-b]pyridin-5-yl)-N-(2-hydroxyethoxy)benzamide

Step 1: Synthesis of 4-bromo-N-(2-hydroxyethoxy)benzamide

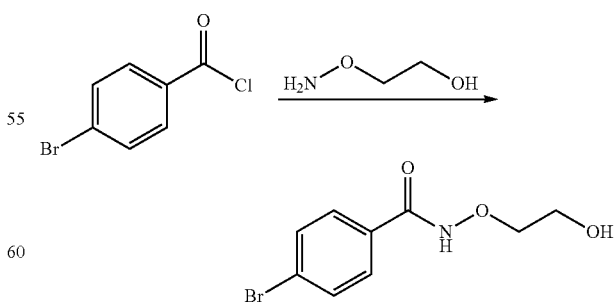

4-Bromobenzoyl chloride (1 eq., 0.200 mg, 0.91 mmol) was dissolved in dichlormethane (5 ml) and triethylamine (4 eq., 0.262 mg, 3.64 mmol) was added followed by 2-(aminooxy)ethan-1-ol (1 eq., 0.070 mg, 0.91 mol). The reaction was monitored by TLC. After stirring at RT for 16 h, the reaction mixture was poured in to ice cold water and extracted with DCM (10 ml). The organic layer was separated, washed with brine, dried over anhydrous sodium sulfate, then concentrated under reduced pressure to get the crude compound. The crude compound was purified by column chromatography to afford 4-bromo-N-(2-hydroxyethoxy)benzamide (0.120 g, 50%)

$^1$H NMR (400 MHz, DMSO-d$_6$) δ 11.85 (s, 1H), 7.72 (m, 4H), 4.76 (s, 1H), 3.92 (m, 2H), 3.60 (m, 2H)

LCMS: 260.80 [M+H]$^+$, 261.80 [M+H]$^+$, 261.8 [M+Na]$^+$, 260.8 [M+Na]$^+$

Step 2: 4-(3-(2,4-difluoro-3-(propylsulfonamido) benzoyl)-1H-pyrrolo[2,3-b]pyridin-5-yl)-N-(2-hydroxyethoxy)benzamide mg, 290 mmol) and potassium fluoride (46.2 mg, 0.795 mmol) were suspended in 1,4-dioxane (0.9 mL) and water (0.45 mL) and degassed with argon for 5 min. Pd(dppf)Cl$_2$ (8.09 mg, 0.0111 mmol) was added and the mixture was heated to 90° C. for 6 h. The solvent was evaporated and the residue dissolved in 10 mL MeOH. Potassium carbonate (1 g) was added and the mixture was stirred at RT. After 6 h, water was added and the pH was adjusted to ~7 with aqueous HCl solution (1N). The aqueous phase was extracted with EtOAc three times, the combined organics were dried over sodium sulfate and the solvent removed in vacuo. The product was purified by preparative RP-HPLC.

Analytical Data:

1H NMR (400 MHz, DMSO-d$_6$) δ 12.94 (s, 1H), 11.85 (s, 1H), 9.66 (s, 1H), 8.74 (d, J=8.7 Hz, 2H), 8.10 (s, 1H), 7.89 (dd, J=19.2, 8.2 Hz, 4H), 7.70-7.58 (m, 1H), 7.35

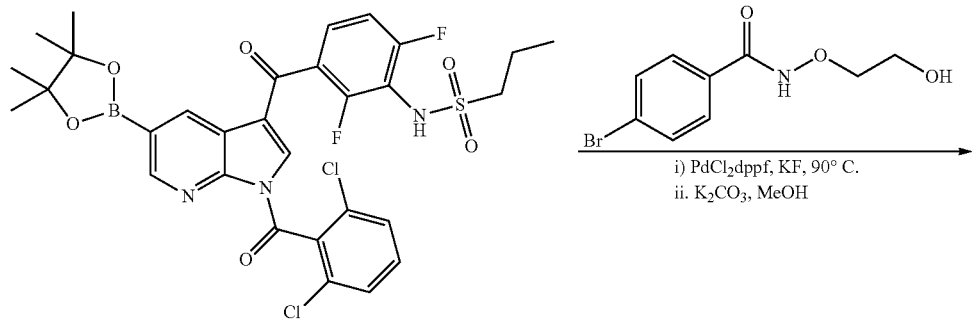

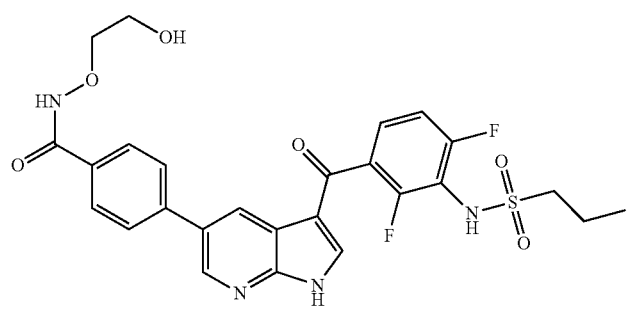

N-(3-(1-(2,6-dichlorobenzoyl)-5-(4,4,5,5-tetramethyl-1,3,2-dioxaborolan-2-yl)-1H-pyrrolo[2,3-b]pyridine-3-carbonyl)-2,6-difluorophenyl)propane-1-sulfonamide (180 mg, 0.265 mmol), 4-bromo-N-(2-hydroxyethoxy)benzamide (75

(t, J=8.7 Hz, 2H), 4.79 (t, J=5.6 Hz, 1H), 3.95 (t, J=4.6 Hz, 2H), 3.69-3.61 (m, 2H), 3.18-3.10 (m, 2H), 1.88-1.77 (m, 2H), 1.00 (t, J=7.4 Hz, 3H).

LC-MS: 559.20 [M+H]$^+$.

In analogy to examples 2 and 3 the following products were prepared:

| Expl. | Reactand | Product | ¹H-NMR/MS |
|---|---|---|---|
| 4 | (4-bromophenyl)dimethylphosphine oxide | Formula: C₂₅H₂₄F₂N₃O₄PS<br>Calculated mass: 531.51<br>Exact Mass: 531.2 | ¹H NMR (400 MHz, DMSO-d₆) δ 12.95 (s, 1H), 9.69-9.58 (m, 1H), 8.77-8.71 (m, 2H), 8.10 (s, 1H), 7.98-7.85 (m, 3H), 7.70-7.59 (m, 1H), 7.34 (s, 1H), 3.19-3.12 (m, 2H), 1.86-1.76 (m, 2H), 1.70 (d, J = 13.3 Hz, 3H), 1.00 (t, J = 7.4 Hz, 3H).<br>LC-MS: 532.20 [M + H]⁺ |
| 5 | 5-bromo-2-cyclobutylpyrimidine | Formula: C₂₅H₂₃F₂N₅O₃S<br>Calculated mass: 511.55<br>Exact Mass: 511.15 | 1H NMR (400 MHz, DMSO-d₆) δ 12.97 (s, 1H), 9.63 (s, 1H), 9.11 (s, 2H), 8.74 (d, J = 7.9 Hz, 2H), 8.10 (s, 1H), 7.68-7.57 (m, 1H), 7.33 (t, J = 8.8 Hz, 1H), 3.87-3.76 (m, 1H), 3.18-3.10 (m, 2H), 2.45-2.19 (m, 5H), 2.05 (dd, J = 18.6, 9.2 Hz, 1H), 1.95-1.85 (m, 1H), 1.83-1.73 (m, 2H), 0.98 (t, J = 7.3 Hz, 3H).<br>LC-MS: 512.10 [M + H]⁺ |
| 6 | 5-bromo-2-cyclopentylpyrimidine | Formula: C₂₆H₂₅F₂N₅O₃S<br>Calculated mass: 525.57<br>Exact Mass: 525.16 | 1H NMR (400 MHz, DMSO-d₆) δ 12.97 (s, 1H), 9.63 (s, 1H), 9.09 (s, 2H), 8.73 (d, J = 8.1 Hz, 2H), 8.10 (s, 1H), 7.70-7.59 (m, 1H), 7.34 (s, 1H), 3.19-3.09 (m, 2H), 2.13-1.99 (m, 2H), 1.97-1.59 (m, 9H), 1.04-0.92 (m, 3H).<br>LC-MS: 526.10 [M + H]⁺ |
| 7 | 5-bromo-2-cyclopropylpyrimidine | Formula: C₂₄H₂₀F₃N₅O₃S<br>Calculated mass: 515.51<br>Exact Mass: 515.12 | ¹H NMR (400 MHz, DMSO-d₆) δ 13.10 (s, 1H), 9.62 (s, 1H), 9.03 (s, 2H), 8.75 (s, 1H), 8.70 (s, 1H), 8.34-8.30 (m, 1H), 3.18-3.09 (m, 2H), 2.32-2.24 (m, 1H), 1.85-1.73 (m, 2H), 1.14-1.04 (m, 4H), 0.99 (t, J = 7.4 Hz, 3H).<br>LC-MS: 516.05 [M + H]⁺ |
| 8 | 5-bromo-2-chloro-4-methylpyrimidine | Formula: C₂₃H₂₁F₂N₅O₄S<br>Calculated mass: 501.51<br>Exact Mass: 501.13 | ¹H NMR (400 MHz, DMSO-d₆) δ 12.96 (s, 1H), 9.64 (s, 1H), 8.50 (s, 1H), 8.44 (dd, J = 12.6, 2.1 Hz, 2H), 8.11 (s, 1H), 7.64 (dd, J = 14.4, 7.7 Hz, 1H), 7.34 (t, J = 8.8 Hz, 1H), 3.97 (s, 3H), 3.19-3.11 (m, 2H), 2.41 (s, 3H), 1.81 (dq, J = 14.9, 7.4 Hz, 2H), 1.00 (t, J = 7.4 Hz, 3H).<br>LC-MS: 502.00 [M + H]⁺ |
| 9 | 5-bromo-4-methylpyrimidine | Formula: C₂₂H₁₉F₂N₅O₃S<br>Calculated mass: 471.48<br>Exact Mass: 471.12 | ¹H NMR (400 MHz, DMSO-d₆) δ 13.01 (s, 1H), 9.66 (s, 1H), 9.10 (s, 1H), 8.71 (s, 1H), 8.50 (dd, J = 13.3, 2.2 Hz, 2H), 8.14 (s, 1H), 7.66 (dd, J = 14.3, 8.0 Hz, 1H), 7.35 (t, J = 8.9 Hz, 1H), 3.18-3.12 (m, 2H), 1.87-1.73 (m, 2H), 1.00 (t, J = 7.4 Hz, 3H).<br>LC-MS: 471.99 [M + H]⁺ |

US 12,466,826 B2

23    24

-continued

| Expl. | Reactand | Product | ¹H-NMR/MS |
|---|---|---|---|
| 10 | 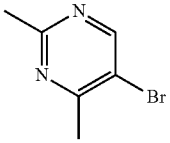 | 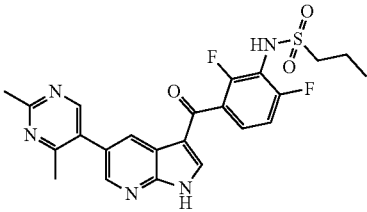 [SMILES: CCCS(=O)(=O)Nc1c(F)ccc(C(=O)c2c[nH]c3ncc(-c4cnc(C)nc4C)cc23)c1F]<br>Formula: C₂₃H₂₁F₂N₅O₃S<br>Calculated mass: 485.51<br>Exact Mass: 485.13 | ¹H NMR (400 MHz, DMSO-d₆) δ 13.00 (s, 1H), 9.66 (s, 1H), 8.58 (s, 1H), 8.46 (d, J = 11.2 Hz, 2H), 8.13 (s, 1H), 7.66 (d, J = 6.4 Hz, 1H), 7.35 (t, J = 8.5 Hz, 1H), 3.20-3.09 (m, 2H), 2.65 (s, 3H), 2.44 (s, 3H), 1.88-1.72 (m, 2H), 1.00 (t, J = 7.1 Hz, 3H).<br>LC-MS: 486.02 [M + H]⁺ |
| 11 | 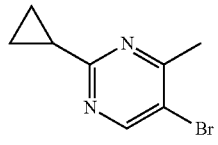 | 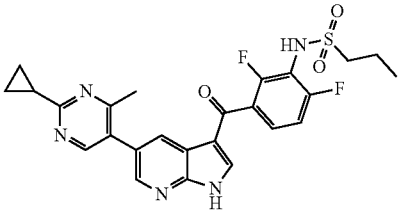 [SMILES: CCCS(=O)(=O)Nc1c(F)ccc(C(=O)c2c[nH]c3ncc(-c4cnc(C5CC5)nc4C)cc23)c1F]<br>Formula: C₂₅H₂₃F₂N₅O₃S<br>Calculated mass: 511.55<br>Exact Mass: 511.15 | ¹H NMR (400 MHz, DMSO-d₆) δ 12.98 (s, 1H), 9.66 (s, 1H), 8.51 (s, 1H), 8.45 (dd, J = 9.3, 2.0 Hz, 2H), 8.12 (s, 1H), 7.65 (dd, J = 14.5, 7.7 Hz, 1H), 7.35 (t, J = 8.8 Hz, 1H), 3.18-3.09 (m, 2H), 2.41 (s, 3H), 2.28-2.18 (m, 1H), 1.87-1.73 (m, 2H), 1.12-1.02 (m, 4H), 1.00 (t, J = 7.4 Hz, 3H).<br>LC-MS: 512.27 [M + H]⁺ |
| 12 | 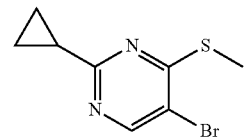 | 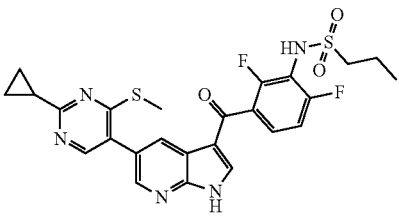 [SMILES: CCCS(=O)(=O)Nc1c(F)ccc(C(=O)c2c[nH]c3ncc(-c4cnc(C5CC5)nc4SC)cc23)c1F]<br>Formula: C₂₅H₂₃F₂N₅O₃S₂<br>Calculated mass: 543.61<br>Exact Mass: 543.12 | ¹H NMR (400 MHz, DMSO-d₆) δ 13.01 (s, 1H), 9.66 (s, 1H), 8.57 (s, 1H), 8.41 (s, 1H), 8.12 (s, 1H), 7.66 (dd, J = 14.5, 7.7 Hz, 1H), 7.35 (t, J = 8.7 Hz, 1H), 3.20-3.11 (m, 2H), 2.28-2.19 (m, 1H), 1.86-1.74 (m, 2H), 1.16-1.05 (m, 4H), 1.00 (t, J = 7.4 Hz, 3H).<br>LC-MS: 544.15 [M + H]⁺ |
| 13 | 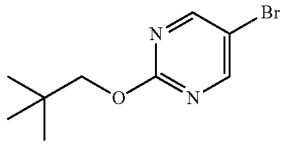 | 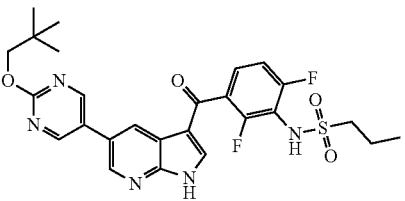 [SMILES: CCCS(=O)(=O)Nc1c(F)ccc(C(=O)c2c[nH]c3ncc(-c4cnc(OCC(C)(C)C)nc4)cc23)c1F]<br>Formula: C₂₆H₂₇F₂N₅O₄S<br>Calculated mass: 543.59<br>Exact Mass: 543.18 | ¹H NMR (400 MHz, DMSO-d₆) δ 12.94 (sz, 1H), 8.97 (s, 2H), 8.69 (d, J = 5.4 Hz, 2H), 8.08 (s, 1H), 7.49 (s, 1H), 7.31-7.23 (m, J = 9.2 Hz, 1H), 4.08 (s, 2H), 3.10-3.00 (m, 3H), 1.78 (dd, J = 15.0, 7.5 Hz, 3H), 1.04 (s, 9H), 0.98 (t, J = 7.4 Hz, 3H).<br>LC-MS: 544.15 [M + H]⁺ |
| 14* | 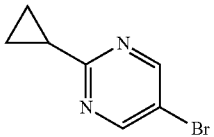 | 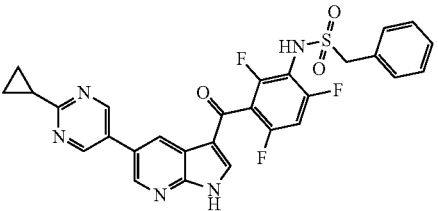 [SMILES: O=C(c1c(F)cc(F)c(NS(=O)(=O)Cc2ccccc2)c1F)c1c[nH]c2ncc(-c3cnc(C4CC4)nc3)cc12]<br>Formula: C₂₈H₂₀F₃N₅O₃S<br>Calculated mass: 563.56<br>Exact Mass: 563.12 | ¹H NMR (400 MHz, DMSO-d₆) δ 13.10 (s, 1H), 9.73 (s, 1H), 9.04 (s, 2H), 8.75 (d, J = 2.1 Hz, 1H), 8.71 (s, 1H), 8.30 (s, 1H), 2.31-2.25 (m, 1H), 1.14-1.03 (m, 4H).<br>LC-MS: 564.34 [M + H]⁺ |

*As starting material, commercially available 2,4,6-trifluoro-3-nitrobenzoic acid was used.

Example 15: Biological Activity

The kinase activities of the compounds of the invention were measured using the 33PanQinase® Assay Service provided by ProQinase GmbH, Freiburg, Germany. Details of the assay conditions are disclosed on the website of ProQinase (https://www.proqinase.com/products-services-biochemical-assay-services/kinase-assays).

In brief, all kinase assays were performed in 96-well FlashPlates™ from PerkinElmer (Boston, MA, USA) in a 50 µl reaction volume. The reaction cocktail was pipetted in four steps in the following order:

20 µl of assay buffer (standard buffer)

5 µl of ATP solution (in $H_2O$)

5 µl of test compound (in 10% DMSO)

20 µl enzyme/substrate mix

The assay for all protein kinases contained 70 mM HEPES-NaOH pH7.5, 3 mM $MgCl_2$, 3 mM $MnCl_2$, 3 µM Na-orthovanadate, 1.2 mM DTT, 50 µg/ml PEG20000, ATP (variable concentrations, corresponding to the apparent ATP-Km of the respective kinase), [$\gamma$-$^{33}$P]-ATP (approx. 8×1005 cpm per well), protein kinase and substrate.

The reaction cocktails were incubated at 30° C. for 60 minutes. The reaction is stopped with 50 µl of 2% (v/v) $H_3PO_4$, plates were aspirated and washed two times with 200 µl 0.9% (w/v) NaCl. Incorporation of $^{33}$Pi was determined with a microplate scintillation counter (Microbeta, Wallac).

All assays were performed with a BeckmanCoulter/SAGIAN™ Core System.

In case of single concentration assays, the potency of the test compound is expressed as % residual activity. For determination of IC50-values, serial dilutions in the final concentration range between 100 µM and 3 nM (10 concentrations) were tested. The fitting model for the IC50 determinations was "Sigmoidal response (variable slope)" with parameters "top" fixed at 100% and "bottom" at 0%. The fitting method used was a least-squares fit.

MKK4 Potency:

| | category |
|---|---|
| $IC_{50}$ < 100 nM: | +++ |
| 100 nM < $IC_{50}$ < 1 µM: | ++ |
| 1 µM < $IC_{50}$ < 10 µM: | + |
| $IC_{50}$ > 10 µM: | o |

Selectivity of test compounds against BRaf, JNK1 and MKK7, altogether denominated as off-targets was calculated by the ratio of IC50 (off-target)/IC50 (MKK4) and categorized as follows:

| | Category |
|---|---|
| $IC_{50}$(off-target)/$IC_{50}$(MKK4) > 100 | +++ |
| 100 ≥ $IC_{50}$(off-target)/$IC_{50}$(MKK4) > 10 | ++ |
| 10 ≥ $IC_{50}$(off-target)/$IC_{50}$(MKK4) > 3 | + |
| 3 ≥ $IC_{50}$(off-target)/$IC_{50}$(MKK4) | o |

The results are given in table 1 below.

TABLE 1

Biochemical potency of representative Examples to MKK4 and selectivity against BRaf, MKK7 and JNK1, based on inhibition of enzyme activity at a single concentration or on $IC_{50}$-values.

| | Potency | Selectivity | | |
|---|---|---|---|---|
| Example | MKK4 | BRaf | JNK1 | MKK7 |
| 3 | +++ | ++ | ++ | +++ |
| 4 | +++ | ++ | ++ | +++ |
| 5 | ++ | +++ | +++ | +++ |
| 6 | + | +++ | ++ | +++ |
| 7 | +++ | +++ | +++ | +++ |
| 8 | +++ | ++ | + | +++ |
| 9 | +++ | +++ | ++ | +++ |
| 10 | +++ | +++ | +++ | +++ |
| 11 | +++ | +++ | +++ | +++ |
| 12 | ++ | ++ | ++ | +++ |
| 13 | o | + | + | + |
| 14 | +++ | ++ | ++ | +++ |

The invention claimed is:
1. A compound having formula (I)

(I)

wherein
R$^1$ is H or alkyl;
R$^2$ is H or alkyl;
R$^4$ is H, or alkyl;
R$^6$ is H, or alkyl;
R$^w$ is —NR$^{10}$SO$_2$R$^{12}$;
R$^{10}$ is H, alkyl, or phenylalkyl;
R$^{12}$ is H, alkyl, or phenylalkyl, wherein the phenyl group is optionally substituted with 1 or 2 groups independently selected from alkyl and halogen;
R$^x$, R$^y$, R$^z$ and R$^{zz}$ are selected from:
a) R$^x$ and R$^y$ are F and R$^z$ and R$^{zz}$ are H; and
b) R$^x$, R$^y$ and R$^{zz}$ are F and R$^z$ is H;
R$^5$ is selected from
(a) phenyl which is substituted with 1, 2 or 3 groups independently selected from
—POdi(alkyl), and
hydroxyalkyl-ONH—CO—;
(c) pyrimidinyl which is substituted with 1, 2 or 3 groups independently selected from
alkyl,
cycloalkyl,
alkoxy, and
alkylsulfanyl,
or a pharmaceutically acceptable salt or optical isomer thereof.

2. The compound of claim 1, wherein R$^5$ is phenyl which is substituted with 1 or 2 groups independently selected from —POdi(alkyl), and hydroxyalkyl-ONH—CO—; or and a pharmaceutically acceptable salt or optical isomer thereof.

3. The compound of claim 1, wherein R⁵ is pyrimidinyl which is substituted with 1 or 2 groups independently selected from alkyl, cycloalkyl, alkoxy, and alkylsulfanyl; or a pharmaceutically acceptable salt or optical isomer thereof.

4. The compound of claim 3, wherein the pyrimidinyl is bound in 5-position to the 1H-pyrrolo [2,3-b]pyridine and is substituted in 2-position with alkyl, cycloalkyl, or alkoxy and optionally substituted in 4-position with alkyl or alkylsulfanyl; or a pharmaceutically acceptable salt or optical isomer thereof.

5. The compound of claim 4, wherein the pyrimidinyl is bound in 5-position to the 1H-pyrrolo [2,3-b]pyridine and is substituted in 2-position with cycloalkyl or alkyl, and optionally substituted in 4-position with a group independently selected from alkyl and alkylsulfanyl, or a pharmaceutically acceptable salt or optical isomer thereof.

6. The compound of claim 1 having formula (Ia) or (Ib)

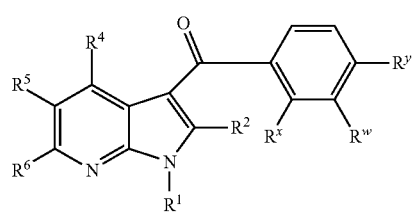
(Ia)

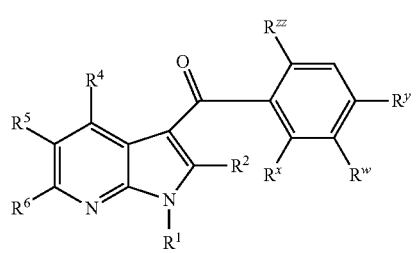
(Ib)

or a pharmaceutically acceptable salt or optical isomer thereof.

7. The compound of claim 1, wherein R¹, R², R⁴ and R⁶ are H, or a pharmaceutically acceptable salt or optical isomer thereof.

8. A compound of claim 1 selected from

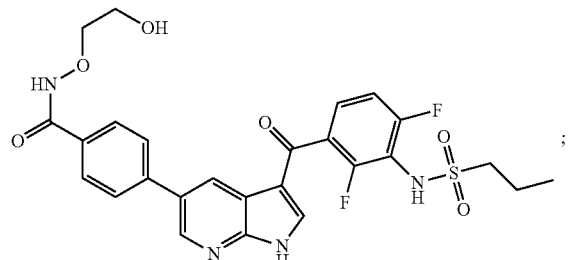

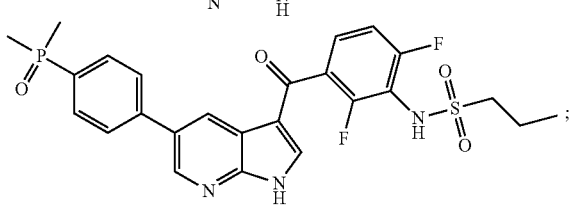

-continued

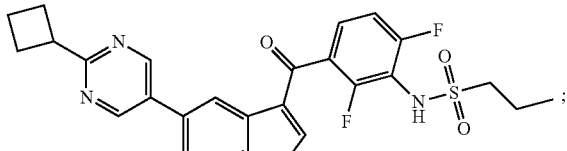

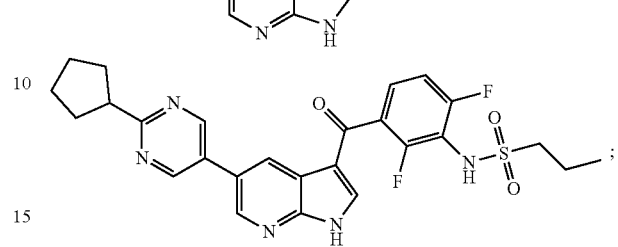

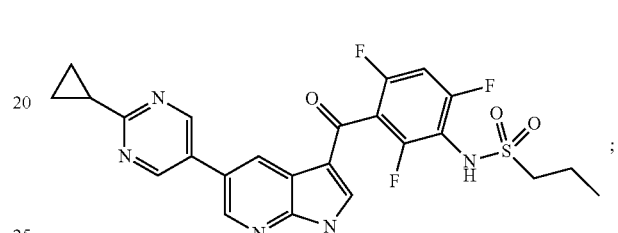

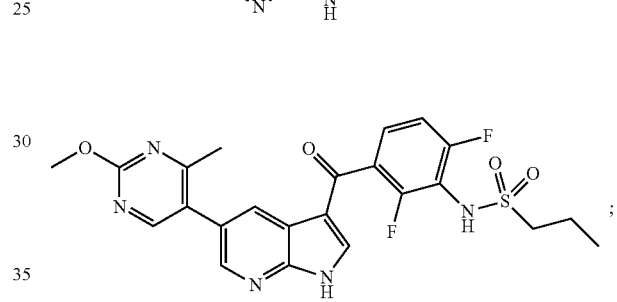

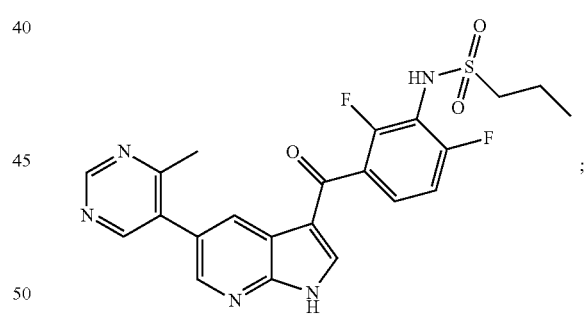

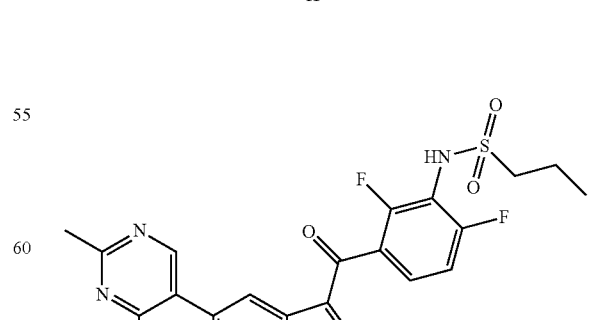

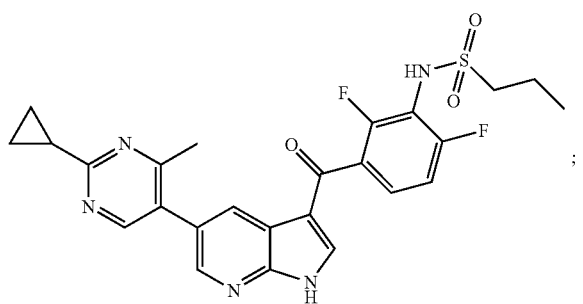

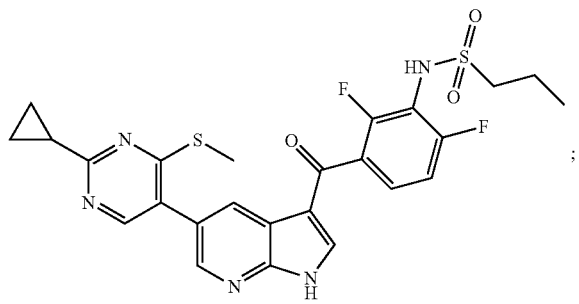

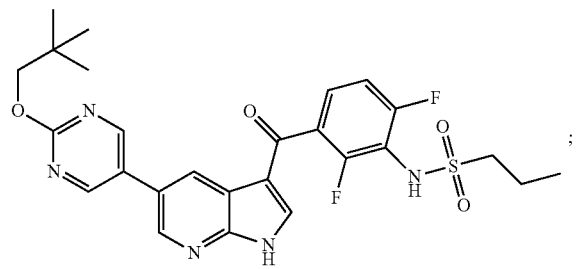

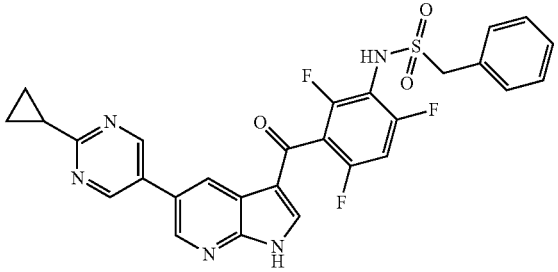

or a pharmaceutically acceptable salt or optical isomer thereof.

9. A pharmaceutical composition comprising a compound of claim 1 or a pharmaceutically acceptable salt or optical isomer thereof.

10. A method of selectively inhibiting protein kinase MKK4 over protein kinases JNK1 and MKK7 in a subject in need thereof, which comprises administering an effective amount of a compound or a pharmaceutically acceptable salt or optical isomer thereof of claim 1 to the subject in need thereof.

11. A method of selectively inhibiting protein kinase MKK4 over protein kinases JNK1 and MKK7, in a subject in need thereof, which comprises administering an effective amount of a composition according to claim 9 to the subject in need thereof.

12. A method of promoting liver regeneration or reducing or preventing hepatocyte death in a subject in need thereof, which comprises administering an effective amount of a compound or a pharmaceutically acceptable salt or optical isomer thereof of claim 1 to the subject in need thereof.

13. A method of promoting liver regeneration or reducing or preventing hepatocyte death in a subject in need thereof, which comprises administering an effective amount of a composition of claim 9 to the subject in need thereof.

* * * * *